US011361592B2

(12) United States Patent
Lev et al.

(10) Patent No.: US 11,361,592 B2
(45) Date of Patent: Jun. 14, 2022

(54) SYSTEM AND METHOD FOR A MONITORING SYSTEM (71) Applicant: NEC Corporation of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 271 days.

(21) Appl. No.: 16/740,541

(22) Filed: Jan. 13, 2020

(65) Prior Publication Data

US 2021/0216757 A1 Jul. 15, 2021

(51) Int. Cl.
*G06K 9/00* (2022.01)
*G06V 40/20* (2022.01)
*G10L 25/63* (2013.01)
*G06K 9/62* (2022.01)
*G06N 3/08* (2006.01)
*G06V 20/00* (2022.01)

(52) U.S. Cl.
CPC ........... *G06V 40/23* (2022.01); *G06K 9/6267* (2013.01); *G06N 3/08* (2013.01); *G06V 20/00* (2022.01); *G06V 40/28* (2022.01); *G10L 25/63* (2013.01)

(58) Field of Classification Search
CPC ..... G06K 9/00771; G06K 2009/00738; G06K 9/00342; G06K 9/00006; G06K 9/00013; G06K 9/00369; G06K 9/00718; G06K 9/00087; G06K 9/00255; G06K 9/6215; G06K 2009/3291; G06K 9/00; G06K 9/00288; G06K 9/00362; G06K 9/00496; G06K 9/00778; G06K 9/2027; G06K 9/46; G06K 19/07381; G06K 19/077; G06K 19/07779; G06K 2009/488; G06K 2209/09; G06K 2209/23; G06K 2209/27; G06K 5/00
See application file for complete search history.

(56) References Cited

U.S. PATENT DOCUMENTS

| | | | | |
|---|---|---|---|---|
| 2007/0121999 | A1* | 5/2007 | Ma | G06K 9/00771 382/103 |
| 2012/0106782 | A1* | 5/2012 | Nathan | G08B 21/14 382/103 |
| 2013/0188842 | A1* | 7/2013 | Hauke | G06K 9/00718 382/115 |
| 2018/0357870 | A1* | 12/2018 | Siminoff | G08B 13/19606 |

OTHER PUBLICATIONS

Xu "Dual-channel CNN for efficient abnormal behavior identification through crowd feature engineering," 2018 (Year: 2018).*

* cited by examiner

*Primary Examiner* — Alex Kok S Liew (57) ABSTRACT

A monitoring system, comprising: at least one device, comprising at least one processing circuitry configured for: receiving from at least one image sensor connected to the at least one processing circuitry, at least one digital image captured by the at least one image sensor; identifying a nature of at least one relationship between at least one first body part of at least one first person and at least one second body part of at least one second person, where the at least one first person and the at least one second person are identified in the at least one digital image; identifying at least one offending relationship according to the nature of the at least one relationship and a set of relationship rules; and outputting an indication of the at least one offending relationship.

18 Claims, 4 Drawing Sheets

SYSTEM AND METHOD FOR A MONITORING SYSTEM

FIELD AND BACKGROUND OF THE INVENTION

The present invention, in some embodiments thereof, relates to a monitoring system and, more specifically, but not exclusively, to a system for detecting offensive behavior.

There exist a variety of systems aimed at detecting offensive behavior perpetrated by one or more people against one or more other people. Offensive behavior may be violent, comprising exercising physical force by one or more people against one or more other people, possibly with the intent to cause harm. Such offensive behavior may be identified by detecting physical proximity between two or more people, or detecting actions such as throwing of an object by one person towards another person. Offensive behavior that is violent may comprise use of threatening or intimidating language. Offensive behavior may be aggressive without being violent, for example by using language expressing anger. Such offensive behavior may be identified using methods such as methods for detecting use of an offensive vocabulary and additionally or alternatively methods for detecting sentiment in a person's facial expressions or vocal utterances. Some offensive behavior has a sexual nature.

However, some cultural norms define offensive behavior using nuances finer than physical proximity between two people, demonstrating a sentiment, or using an identified offensive vocabulary. For example, there exist cultures where looking at a person's chest is considered offensive. Another example is the Jewish religious law prohibiting seclusion in a private area of a man and a woman not married to each other.

There exists a need to identify behavior that is offensive according to cultural norms.

SUMMARY OF THE INVENTION

It is an object of the present invention to provide a system and a method for a monitoring system.

The foregoing and other objects are achieved by the features of the independent claims. Further implementation forms are apparent from the dependent claims, the description and the figures.

According to a first aspect of the invention, a monitoring system comprises at least one device, comprising at least one processing circuitry configured for: receiving from at least one image sensor connected to the at least one processing circuitry, at least one digital image captured by the at least one image sensor; identifying a nature of at least one relationship between at least one first body part of at least one first person and at least one second body part of at least one second person, where the at least one first person and the at least one second person are identified in the at least one digital image; identifying at least one offending relationship according to the nature of the at least one relationship and a set of relationship rules; and outputting an indication of the at least one offending relationship.

According to a second aspect of the invention, a method for monitoring comprises: receiving at least one digital image captured by at least one image sensor; identifying a nature of at least one relationship between at least one first body part of at least one first person and at least one second body part of at least one second person, where the at least one first person and the at least one second person are identified in the at least one digital image; identifying at least one offending relationship according to the nature of the at least one relationship and a set of relationship rules; and outputting an indication of the at least one offending relationship.

According to a third aspect of the invention, a monitoring system for detecting offensive behavior having a sexual nature comprises at least one device, comprising at least one processing circuitry configured for: receiving from at least one image sensor connected to the at least one processing circuitry, at least one digital image captured by the at least one image sensor; identifying a nature of at least one relationship between at least one first body part of at least one first person and at least one second body part of at least one second person, where the at least one first person and the at least one second person are identified in the at least one digital image; identifying at least one offending relationship according to the nature of the at least one relationship and a set of relationship rules indicative of sexual offensive relationships; and outputting an indication of the at least one offending relationship.

With reference to the first and second aspects, in a first possible implementation of the first and second aspects of the present invention at least one of the at least one first body part is selected from a list of body part consisting of: a foot, a hand, an arm, a leg, a part of an arm, a part of a leg, a digit, a head, an eye, an identified dorsal region of a torso, and an identified ventral region of a torso. Optionally, the at least one of the second body part is selected from the list of body parts. Optionally, at least one of the at least one relationship between the at least one first body part and the at least one second body part is selected from a group of body part relationships consisting of: a first identified body part touches a second identified body part, the first identified body part is oriented towards the second identified body part, the first identified body part is moving towards the second identified body part, and a distance between the first identified body part and the second identified body part. Optionally, the nature of the at least one relationship comprises a plurality of relationship characteristics. Optionally, at least one of the plurality of relationship characteristics is selected from a group of relationship characteristics consisting of: an amount of persons identified in the at least one digital image, a gender of one of the at least one first person and the at least one second person and another person identified in the at least one digital image, an age of one of the at least one first person and the at least one second person and the other person, at least one first time value indicative of at least one first time the at least one first person entered a monitored space, at least one second time value indicative of at least one second time the at least one second person entered the monitored space, at least one time difference between the at least one first time value and the at least one second time value, a duration of one of the at least one relationship, an interaction duration of the at least one relationship, a position of a door of the monitored space, a posture of a person identified in the at least one digital image, an item of clothing of a person identified in the at least one digital image, an absence of an item of clothing of a person identified in the at least one digital image, an amount of light identified in the at least one digital image, and an amount of relationships of the at least one relationship. Optionally, the at least one relationship comprises a first relationship and a second relationship, each associated with a time. Optionally, the first relationship comprises a third identified body part of the at least one first identified person moving towards a fourth identified body part of the at least one second identified person, the second relationship comprises a fifth identified body part of the at least one second identified person moving towards a sixth identified body part of the at least one first identified person, and the second relationship's time is later than the first relationship's time. Identifying a second relationship having a later time than a first relationship facilitates identifying a reaction of a second person to an action of a first person, thus facilitates identifying an offending nature of a relationship according to an identification of a reaction.

With reference to the first and second aspects, or the first implementation of the first and second aspects, in a second possible implementation of the first and second aspects of the present invention identifying the nature of the at least one relationship comprises computing the plurality of relationship characteristics by a neural network trained to compute a plurality of computed relationship characteristics in response to at least one input image. Using a neural network trained to compute a plurality of computed relationships characteristics in response to at least one input image increases accuracy of identification of the plurality of relationship characteristics compared to other methods, for example methods applying one or more tests to one or more objects identified in the at least one digital image, and thus increases accuracy of a system's output produced using the plurality of relationship characteristics.

With reference to the first and second aspects, or the first implementation of the first and second aspects, in a third possible implementation of the first and second aspects of the present invention identifying the at least one offending relationship comprises computing, by a relationship-classification neural network trained according to the set of relationship rules, an offense classification value in response to the plurality of relationship characteristics. Optionally, identifying the at least one offending relationship comprises applying to the plurality of relationship characteristics at least one test indicative of at least some of the set of relationship rules.

With reference to the first and second aspects, or the first implementation of the first and second aspects, in a fourth possible implementation of the first and second aspects of the present invention the at least one processing circuitry is further configured to receive at least one audio signal associated with the at least one digital image. Optionally the group of relationship characteristics further consists of: a vocal sound associated with one of the at least one first person and the at least one second person, and a loudness value of the vocal sound. Using one or more audio signals when identifying the at least one relationship increases accuracy of an identification of the nature of the at least one relationship, thus increasing accuracy of a system's output produced according to the at least one relationship.

With reference to the first and second aspects, in a fifth possible implementation of the first and second aspects of the present invention outputting the indication of the at least one offending relationship comprises at least one of a group consisting of: sending the indication to at least one other processing circuitry via at least one digital communication network interface electrically connected to the at least one processing circuitry; delivering an electrical current to an audio device capable of emitting an audio signal, delivering an electrical current to a visual device capable of emitting a visual signal, and displaying a message on a monitor. Optionally, the at least one processing circuitry is further configured for executing at least one management action subject to identifying the at least one offending relationship. Optionally, the at least one management actions is selected from a group of actions consisting of: activating an illuminating device, increasing intensity of an output of an illuminating device, instructing opening of a door, instructing changing a position of an object obstructing a window, instructing an audio device to emit an identified audio signal, displaying on a display device at least some of a plurality of additional digital images received from the at least one image sensor, storing the at least one digital image on a non-volatile digital storage connected to the at least one processing circuitry, and storing on a non-volatile digital storage at least some of a plurality of additional digital images received from the at least one image sensor. Optionally, the at least one digital image is captured by the at least one image sensor in a monitored space, and at least one of the illuminating device, the audio device, the door, the window, and the display device is located in the monitored space. Executing a management action facilitates changing physical conditions of a monitored space, eliminating physical conditions that enable an offending relationship, and intervening to stop an offending relationship.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a monitoring system and, more specifically, but not exclusively, to a system for detecting offensive behavior.

Henceforth, the terms "offending behavior" and "offensive behavior" are used interchangeably and used to mean behavior that is considered offensive according to an identified norm of behavior. In addition, the terms "people" and "persons" are used interchangeably and both are used to mean a plurality of persons.

Some monitoring systems analyze images, and additionally or alternatively audio recordings, captured in a monitored space. Some existing methods used by such systems include detection of physical proximity between two or more persons, facial expression analysis to identify a person's sentiment, voice analysis to identify a person's sentiment, and identification of a posture of a person.

In contrast to offensive behavior characterized by physical proximity between two or more persons, there exists offensive behavior that is characterized not by mere proximity between people, but rather by one or more relationships between body parts of one or more people. For example, a look directed by one person towards an identified body part of another person (i.e. the one person's eyes are oriented towards the identified body part of the other person), such as a chest or a crotch, may be offensive according to some norms of behavior, possibly only when the look lasts more than an identified duration of time. According to some norms of behavior movement of an identified body part of one person towards another identified body part of another person, for example a hand moving towards the other person's cheek, may be considered offensive even when there is no contact. According to some norms of behavior proximity between people is acceptable, however certain body parts may not touch other body parts, for example when standing front to back in a crowded queue.

According to some cultural norms there exists offensive behavior that is dependent on a gender of one or more persons. According to some cultural norms there exists offensive behavior that is dependent on the monitored space, for example an order of people entering a monitored space, a degree of enclosure of the monitored space, for example no closed doors, and an amount of light in the monitored space. According to some cultural norms there exists offensive behavior dependent on a duration of a relationship between a body part of one person and another body part of another person, and additionally or alternatively on an amount of repetitions of the relationship. Some offensive behavior is characterized by a movement of a body part of one person in reaction to another movement of another body part of another person, for example the one person recoiling when the other person leans towards the one person without the other person actually coming close to the one person.

Existing methods as described above do no identify relationships between body parts, and are limited to detecting offensive behavior that is characterized by a physical proximity between two or more persons and additionally or alternatively by one or more sentiments expressed by one or more persons.

The present invention, in some embodiments thereof, proposes identifying offensive behavior by classifying the nature of relationships between body parts of one or more persons. In such embodiments, the present invention proposes identifying a nature of one or more relationships between one or more body parts of at least one person and one or more other body parts of at least one other person, and classifying the nature of the one or more relationships according to a set of relationship rules to identify one or more offending relationships. Using one or more relationships between one or more body parts of one or more persons to identify offensive behavior increases accuracy of an identification of the offensive behavior compared to other systems that identify offensive behavior according to physical proximity between the one or more persons and additionally or alternatively according to one or more sentiments expressed by the one or more persons. The set of relationship rules may reflect a set of cultural norms, for example a set of religion based rules or a set of behavioral norms characteristic of an identified community. Optionally, the at least one person and the at least one other person are identified in one or more digital images received from one or more image sensors, for example a digital camera. Other examples of an image sensor are a digital video camera, and an infra-red camera. Some examples of a relationship between one or more body parts of a first person and one or more other body parts of a second person are: contact between body parts of the first and second person, a body part of the first person being oriented towards another body part of the second person, a body part of the first person moving towards another body part of the second person, and an identified distance between body parts of the first person and the second person. Optionally, the one or more relationships are identified using one or more machine learning models, for example a neural network, trained to identify, in response to input comprising one or more digital images, one or more relationships between one or more body parts of a first person identified in the one or more digital images and one or more other body parts of a second person identified in the one or more digital images. Using one or more machine learning models to identify the one or more relationships increases accuracy of an output of a system for identifying offensive behavior.

Optionally, the nature of the one or more relationships comprises a plurality of relationship characteristics. For example, some relationships have a sexual nature when occurring in one context and no sexual nature when occurring in another. One possible example is a front of one person contacting a back of another person may have a sexual nature when occurring in a workplace, however may have no sexual nature when occurring for a brief duration in a crowded queue. Some examples of a relationship characteristic are: an age of a person identified in a digital image, a gender of a person identified in a digital image, a position of a door of a monitored space, a duration of a relationship, and an amount of the one or more relationships identified. Optionally, identifying the nature of the one or more relationships comprises using one or more other machine learning models, for example one or more neural networks, trained to compute a plurality of relationship characteristics in response to one or more input images. Optionally, the one or more other neural networks trained to compute the plurality of relationship characteristics is the neural network trained to identify the one or more relationships. Using one or more other machine learning models to identify the nature of the one or more relationships increases accuracy of an output of a system for identifying offending behavior.

Optionally, the present invention proposes outputting an indication of the one or more identified offending relationships. Optionally, outputting the indication comprises producing a signal that may be observed by a person, some examples being sounding an alarm and flashing a light. Optionally, outputting the indication comprises displaying a message on a display device, for example a monitor. Optionally, outputting the indication comprises sending the indication, for example to another system, for example by sending a message to the other system. A message may comprise text. A message may comprise an audio signal. Some examples of a message are a digital mail message, a short message service (SMS) message, an immediate messaging system (IM) message, and a phone call. Optionally, the message is sent to one or more identified people, for example security personnel.

In addition, some embodiments of the present invention propose executing one or more management actions subject to identifying one or more offending relationships. For example, activating an illuminating device, for example for the purpose of illuminating the monitored space. Another example of a management action is opening a door, for example to reduce seclusion of one or more people located in the monitored space from other people located outside the monitored space. Other examples of a management action include raising a blind covering a window, and storing one or more digital images on non-volatile digital storage, for example a hard disk drive or a network storage. Executing one or more management actions subject to identifying one or more offending relationships allows changing one or more physical conditions of a monitored space upon identifying the one or more offending relationships, increasing usability of a system implemented according to the present invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
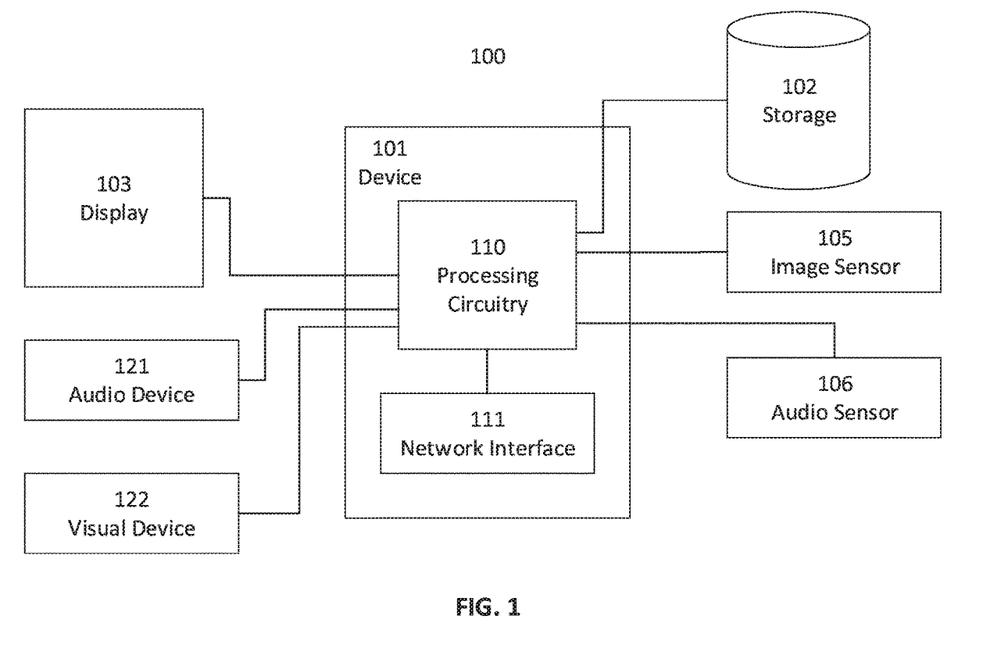
FIG. 1 is a block diagram of an exemplary system, according to some embodiments of the present invention.

Reference is now made to FIG. 1, showing a block diagram of an exemplary system 100, according to some embodiments of the present invention. In such embodiments, device 101 comprises at least one processing circuitry 110. The processing circuitry may be any kind of programmable or non-programmable circuitry that is configured to carry out the operations described below. The processing circuitry may comprise hardware as well as software. For example, the processing circuitry may comprise one or more processors and a transitory or non-transitory memory that carries a program which causes the processing circuitry to perform the respective operations when the program is executed by the one or more processors. For brevity, henceforth the term "processing unit" is used to mean "at least one processing circuitry", and the terms are used interchangeably.

Optionally, device 101 comprises at least one digital communication network interface 111, optionally connected to processing unit 110. For brevity, the term "network interface" is used to mean "at least one digital communication network interface" and the terms are used interchangeably. Optionally, network interface is electrically connected to processing unit 110. Optionally, network interface 111 is connected to a local area network (LAN), some examples being an Ethernet network and a wireless network, for example a Wi-Fi network. Optionally, network interface 111 is connected to a wide area network (WAN) some examples being a cellular network and the Internet.

Optionally, system 100 comprises one or more image sensors 105, optionally for the purpose of capturing one or more digital images. For brevity, henceforth the term "image sensor" is used to mean "one or more image sensors". Optionally, image sensor 105 is installed in a monitored space. Optionally, the one or more digital images are captured in the monitored space. Optionally, device 101 comprises image sensor 105. Optionally, image sensor 105 is connected to processing unit 110. Optionally, image sensor 105 is connected to device 101. Optionally, device 101 is installed at another location which is not the monitored space. Optionally, image sensor 105 is connected to device 101 via network interface 111. Optionally, image sensor 105 delivers one or more captured digital images to processing unit 110, optionally via network interface 111. Some examples of an image sensor are a digital camera, a digital video camera, and an infra-red camera.

Optionally, system 100 comprises one or more audio sensors 106, for example one or more microphones, optionally for the purpose of capturing one or more audio signal, optionally in the monitored space. For brevity, henceforth the term "audio sensor" is used to mean "one or more audio sensors". Optionally, audio sensor 106 is connected to device 101. Optionally, audio sensor 106 is connected to processing unit 110. Optionally, audio sensor 106 is connected to device 101 via network interface 111. Optionally, audio sensor 106 delivers one or more captured audio signals to processing unit 110, optionally via network interface 111.

Optionally, processing unit 110 is connected to one or more non-volatile digital storage 102, optionally for the purpose of storing one or more digital images received from image sensor 105. Some examples of a non-volatile digital storage are a hard disk drive, a non-volatile random access memory, a network storage, and a storage network. For brevity, henceforth the tem "storage" is used to mean "one or more non-volatile digital storage". Optionally, processing unit 110 is connected to storage 102 via network interface 111.

Optionally, processor 110 is connected to at least one display device 103, optionally for the purpose of displaying an outcome of processing the one or more digital images received from image sensor 105. Some examples of a display device are a monitor and a computer having a screen. Optionally, processing unit 110 is connected to at least one audio device 121, for example a speaker or a computer having a speaker, optionally for the purpose of emitting an identified audio signal such as an alarm sound, a recorded message, or an audio signal sent from processing unit 110, optionally subject to an outcome of processing the one or more digital images received from image sensor 105. Optionally, processing unit 110 is connected to at least one visual device 122, for example an illuminating device, for example comprising a lightbulb, optionally for the purpose of illuminating a space, for example the monitored space, optionally subject to an outcome of processing the one or more digital images received from image sensor 105.

To monitor a system, in some embodiments of the present invention system 100 implements the following optional method.

Figure 2:
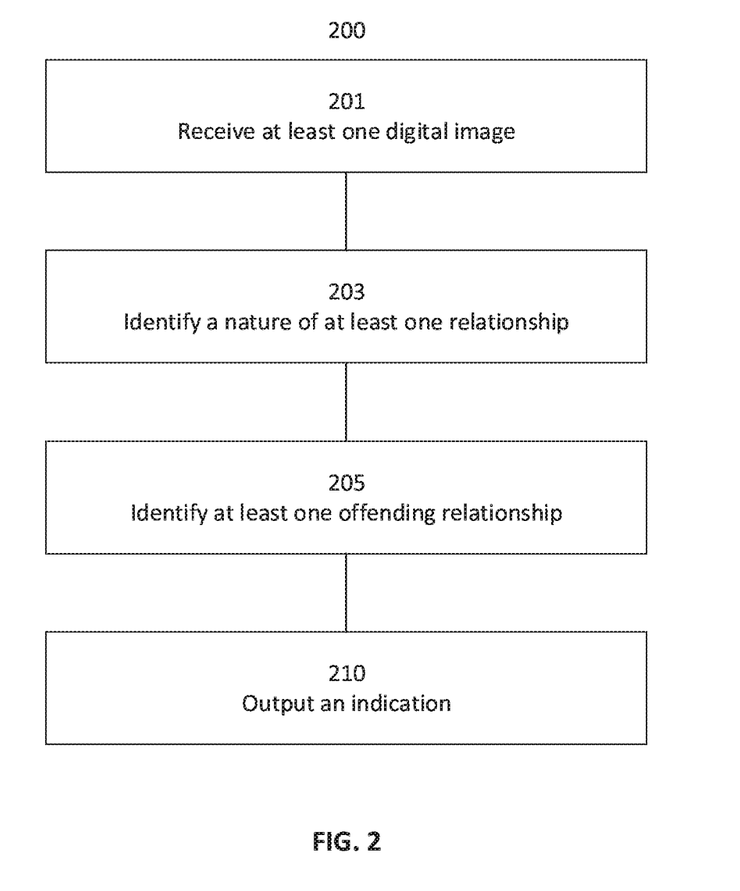
FIG. 2 is a flowchart schematically representing a first optional flow of operations, according to some embodiments of the present invention.

Reference is now made also to FIG. 2, showing a flowchart schematically representing a first optional flow of operations 200, according to some embodiments of the present invention. In such embodiments, in 201 processing unit 110 receives from image sensor 105 one or more digital images captured by image sensor 105, optionally captured in a monitored space. In 203, processing unit 110 optionally identifies in the one or more digital images at least one first person and at least one second person. Optionally, processing unit 110 identifies at least one first body part of the at least one first person. Optionally, processing unit 110 identifies at least one second body part of the at one second person. Some examples of a body part are a foot, a hand, an arm, a leg, a part of an arm, a part of a leg, a digit, a head, an eye, an identified ventral region of a torso, for example a chest or an abdomen, and an identified dorsal region of a torso, for example a shoulder.

Optionally, in 203, processing unit 110 identifies a nature of at least one relationship between the first body part and the at least one second body part. Some examples of a body part relationship are: a first identified body part touches a second identified body part, the first identified body part is oriented towards the second identified body part, the first identified body part is moving towards the second identified body part, and a distance between the first identified body part and the second identified body part.

For brevity, henceforth the term "the persons identified in the images" is used to mean "the at least one first person and the at least one second person identified in the one or more digital images".

Optionally, a nature of a relationship between two or more body parts comprises a plurality of relationship characteristics. Optionally, identifying the nature of the at least one relationship between the first body part and the second body part comprises analyzing the plurality of relationship characteristics of the at least one relationship. Optionally, processing unit 110 computes the plurality of relationship characteristics by executing a neural network, optionally providing the neural network with input comprising the one or more digital images. Optionally, the neural network is trained to compute a plurality of relationship characteristics in response to at least one input image. Optionally, the neural network performs skeletonization, i.e. reducing each of one or more objects identified in the one or more digital images to 1-pixel wide curved lines, without changing an essential structure of the one or more digital image and preserving a topology of the one or more objects in the one or more digital images. Some examples of a relationship characteristic are: an amount of persons identified in the one or more digital images, a gender of at least one of the persons identified in the images, an age of at least one of the persons identified in the images, at least one first time value indicative of at least one first time the at least one first person entered a monitored space, at least one second time value indicative of at least one second time the at least one second person entered the monitored space, at least one time difference between the at least one first time value and the at least one second time value, a duration of one of the at least one relationship, an interaction duration of the at least one relationship, a position of a door of the monitored space, a posture of a person identified in the at least one digital image, an item of clothing of a person identified in the at least one digital image, an absence of an item of clothing of a person identified in the at least one digital image, an amount of light identified in the at least one digital image, and an amount of relationships of the at least one relationship.

Optionally, when the at least one relationship comprises at least two relationships, for example a first relationship and a second relationship, the second relationship may be a reaction to the first relationship. When the first relationship and the second relationship are each associated with a respective time, optionally the nature of the at least one relationship is identified according to the second relationship being after the first relationship, i.e. the second relationship has a time later that a time of the first relationship. Optionally, processing unit 110 identifies in the one or more digital messages a third identified body part and a sixth identified body part of the at least one first person. Optionally, processing unit 110 identifies in the one or more digital messages a fourth identified body part and a fifth identified body part of the at least one second person. Optionally, the first relationship comprises the third identified body part moving towards the fourth body part, and the second relationship comprises the fifth body part moving towards the sixth body part. For example, a hand of the first person may be moving towards the torso of the second person in the first relationship, and in the second relationship a hand of the second person may be moving towards the hand of the first person, for example to stop it.

In 205, processing unit 110 optionally identifies one or more offending relationships. Optionally, processing unit 110 identifies the one or more offending relationships according to the nature of the at least one relationship identified in 203 and a set of relationship rules. Optionally, the set of relationship rules reflects a set of cultural norms, for example a set of religion based rules or a set of behavioral norms characteristic of an identified community. Optionally, the set of rules are indicative of sexual offensive relationships. Optionally, to identify the one or more offending relationship processing unit 110 applies to the plurality of relationship characteristics one or more tests indicative of at least some of the set of relationship rules. Optionally, processing unit 110 identifies the one or more offending relationships by executing a relationship-classification neural network, optionally providing the relationship-classification neural network other input comprising the plurality of relationship characteristics. Optionally, the relationship-classification neural network is trained to compute an offense classification value in response to input comprising a plurality of input relationship characteristics. Optionally, the relationship-classification neural network performs skeletonization.

In 210, processing unit 110 optionally outputs an indication of the one or more offending relationships. Optionally, processing unit 110 outputs the indication by sending the indication to at least one other processing unit via network interface 111, for example by sending a message to the at least one other processing unit. The message may be a digital mail message. Other examples of a message are an IM message, and a short message system (SMS) message. Optionally, the message is a phone call. Optionally, the message is to at least one designated person. Optionally, processing unit 110 outputs the indication by delivering an electrical current to audio device 121, for example for the purpose of sounding an alarm. Optionally, processing unit 110 outputs the indication by sending an output audio signal to audio device 121, for example for the purpose of playing the output audio signal. Optionally, audio device 121 is installed such that at least one designated person may hear a sound emitted thereby. Optionally, processing unit 110 outputs the indication by delivering an electrical current to visual device 122, for example for the purpose of changing a level of illumination emitted thereby. Optionally, visual device 122 is installed such that at least one designated person may see a visual output thereof. Optionally, processing unit 110 outputs the indication by displaying a message on display device 103.

When system 100 comprises audio sensor 106, identification of the nature of the at least one relationship may comprise one or more characteristics extracted from one or more audio signals.

Figure 3:
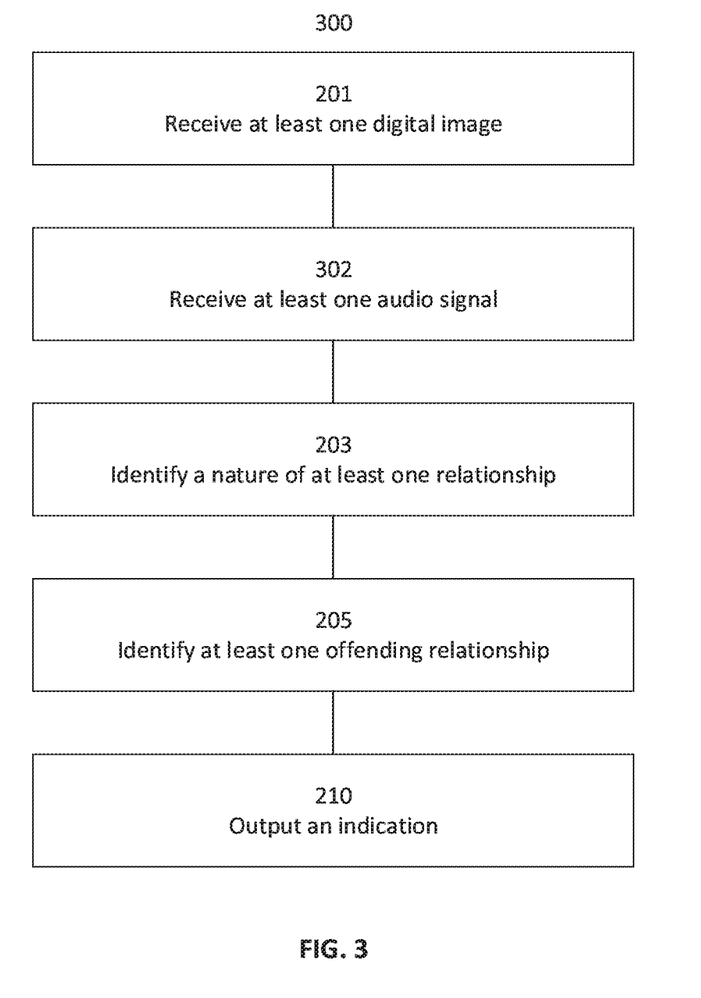
FIG. 3 is a flowchart schematically representing a second optional flow of operations, according to some embodiments of the present invention.

Reference is now made also to FIG. 3, showing a flowchart schematically representing a second optional flow of operations 300, according to some embodiments of the present invention. In such embodiments, in 302 processing unit 110 receives from audio sensor 106 one or more audio signals associated with the one or more digital images received in 201. For example, an audio signal may be an audio signal captured by audio sensor 106 while image sensor 105 captured the one or more images. Optionally, at least one of the at least one relationship characteristics is a vocal sound associated with one of the persons identified in the one or more images. Optionally, at least one of the at least one relationship characteristics is a loudness value of the vocal sound, for example to identify a raised voice in anger or a cry of surprise.

When processing unit 110 computes the plurality of relationship characteristics by executing a neural network, processing unit 110 optionally computes the plurality of relationship characteristics by further inputting the one or more audio signals into the neural network.

Figure 4:
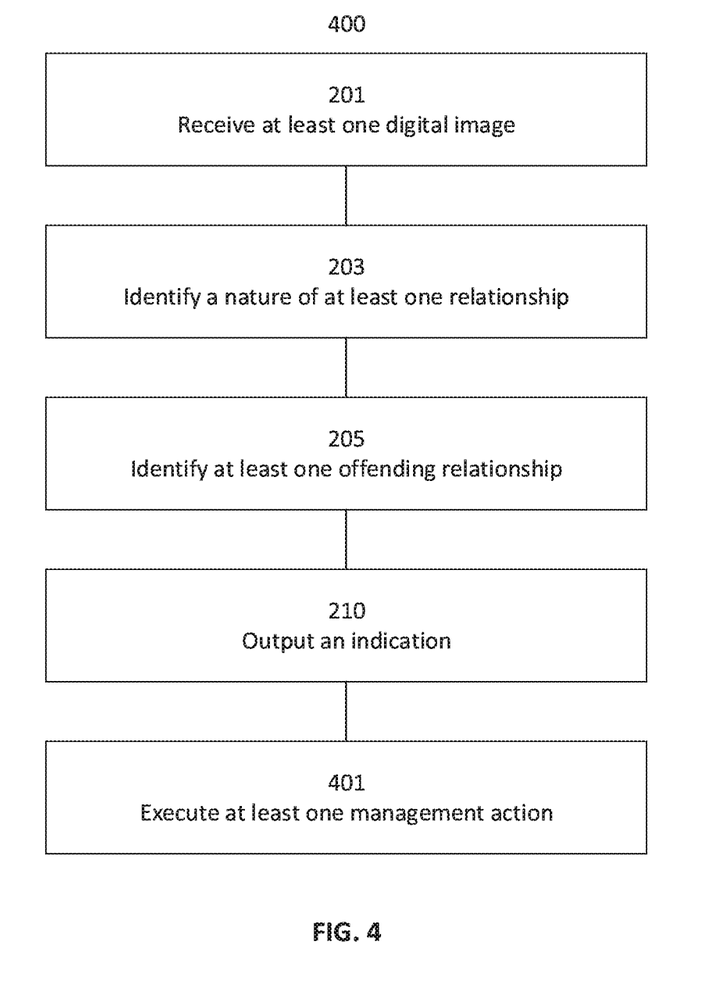
FIG. 4 is a flowchart schematically representing a third optional flow of operations, according to some embodiments of the present invention.

In some embodiments of the present invention, subject to identifying the one or more offending relationships there is a need to execute one or more management actions. To do so, system 100 optionally implements the following non-mandatory method.

Reference is now made also to FIG. 4, showing a flowchart schematically representing a third optional flow of operations 400, according to some embodiments of the present invention. In such embodiments, in 401 processing unit 110 executes one or more management actions, optionally subject to identifying the one or more offending relationships in 205. Optionally, in 401 processing unit 110 activates an illuminating device, for example turns on a light. Optionally, processing unit 110 increases an intensity of an output of the illumination device, for example to increase a degree of lighting in a space. Optionally, processing unit 110 instructs opening of a door. Optionally, processing unit 110 instructs changing a position of an object obstructing a window, for example moving or raising a curtain covering the window. Optionally, processing unit 110 instructs audio device 121 to emit an identified audio signal, for example an alarm sound or an audio signal comprising speech, sent thereto by processing unit 110, for example a warning or instructions. Optionally, processing unit 110 displays on 103 at least some of a plurality of additional digital images received from image sensor 105, for example showing one or more further interactions between the persons identified in the one or more images. Optionally, processing unit 110 stores on storage 102 at least some of the one or more digital images and additionally or alternatively at least some of the one or more additional digital images, for example for the purpose of recording one or more interactions between the persons identified in the one or more images.

A management action may change a physical condition of a monitored space wherein image sensor 105 captures the one or more digital images, for example when one or more of the illumination device, the audio device, the door, the window and the display device is located in the monitored space.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant digital images will be developed and the scope of the term digital image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A monitoring system, comprising: at least one device, comprising at least one processing circuitry configured for:
   receiving from at least one image sensor connected to the at least one processing circuitry, at least one digital image captured by the at least one image sensor;
   identifying a nature of at least one relationship between at least one first body part of at least one first person and at least one second body part of at least one second person, where the at least one first person and the at least one second person are identified in the at least one digital image;
   identifying at least one offending relationship according to the nature of the at least one relationship and a set of relationship rules; and
   outputting an indication of the at least one offending relationship;
   wherein at least one of the at least one first body part is selected from a list of body parts consisting of: a foot, a hand, an arm, a leg, a part of an arm, a part of a leg, a digit, a head, an eye, an identified dorsal region of a torso, and an identified ventral region of a torso; and
   wherein at least one of the second body part is selected from said list of body parts.

2. The monitoring system of claim 1, wherein at least one of the at least one relationship between the at least one first body part and the at least one second body part is selected from a group of body part relationships consisting of: a first identified body part touches a second identified body part, the first identified body part is oriented towards the second identified body part, the first identified body part is moving towards the second identified body part, and a distance between the first identified body part and the second identified body part.

3. The monitoring system of claim 1, wherein the nature of the at least one relationship comprises a plurality of relationship characteristics; and
   wherein at least one of the plurality of relationship characteristics is selected from a group of relationship characteristics consisting of: an amount of persons identified in the at least one digital image, a gender of one of the at least one first person and the at least one second person and another person identified in the at least one digital image, an age of one of the at least one first person and the at least one second person and the other person, at least one first time value indicative of at least one first time the at least one first person entered a monitored space, at least one second time value indicative of at least one second time the at least one second person entered the monitored space, at least one time difference between the at least one first time value and the at least one second time value, a duration of one of the at least one relationship, an interaction duration of the at least one relationship, a position of a door of the monitored space, a posture of a person identified in the at least one digital image, an item of clothing of a person identified in the at least one digital image, an absence of an item of clothing of a person identified in the at least one digital image, an amount of light identified in the at least one digital image, and an amount of relationships of the at least one relationship.

4. The monitoring system of claim 3, wherein identifying the nature of the at least one relationship comprises computing the plurality of relationship characteristics by a neural network trained to compute a plurality of computed relationship characteristics in response to at least one input image.

5. The monitoring system of claim 3, wherein identifying the at least one offending relationship comprises computing, by a relationship-classification neural network trained according to the set of relationship rules, an offense classification value in response to the plurality of relationship characteristics.

6. The monitoring system of claim 3, wherein identifying the at least one offending relationship comprises applying to the plurality of relationship characteristics at least one test indicative of at least some of the set of relationship rules.

7. The system of claim 3, wherein the at least one processing circuitry is further configured to receive at least one audio signal associated with the at least one digital image; and
wherein the group of relationship characteristics further consists of: a vocal sound associated with one of the at least one first person and the at least one second person, and a loudness value of the vocal sound.

8. The system of claim 1, wherein outputting the indication of the at least one offending relationship comprises at least one of a group consisting of: sending the indication to at least one other processing circuitry via at least one digital communication network interface electrically connected to the at least one processing circuitry; delivering an electrical current to an audio device capable of emitting an audio signal, delivering an electrical current to a visual device capable of emitting a visual signal, and displaying a message on a monitor.

9. The system of claim 3, wherein the at least one relationship comprises a first relationship and a second relationship, each associated with a time;
wherein the first relationship comprises a third identified body part of the at least one first identified person moving towards a fourth identified body part of the at least one second identified person;
wherein the second relationship comprises a fifth identified body part of the at least one second identified person moving towards a sixth identified body part of the at least one first identified person; and
wherein the second relationship's time is later than the first relationship's time.

10. The system of claim 1, wherein the at least one processing circuitry is further configured for:
executing at least one management action subject to identifying the at least one offending relationship.

11. The system of claim 10, wherein the at least one management actions is selected from a group of actions consisting of: activating an illuminating device, increasing intensity of an output of an illuminating device, instructing opening of a door, instructing changing a position of an object obstructing a window, instructing an audio device to emit an identified audio signal, displaying on a display device at least some of a plurality of additional digital images received from the at least one image sensor, storing the at least one digital image on a non-volatile digital storage connected to the at least one processing circuitry, and storing on a non-volatile digital storage at least some of a plurality of additional digital images received from the at least one image sensor.

12. The system of claim 11, wherein the at least one digital image is captured by the at least one image sensor in a monitored space; and
wherein at least one of the illuminating device, the audio device, the door, the window, and the display device is located in the monitored space.

13. A method for monitoring, comprising:
receiving at least one digital image captured by at least one image sensor;
identifying a nature of at least one relationship between at least one first body part of at least one first person and at least one second body part of at least one second person, where the at least one first person and the at least one second person are identified in the at least one digital image;
identifying at least one offending relationship according to the nature of the at least one relationship and a set of relationship rules; and
outputting an indication of the at least one offending relationship;
wherein at least one of the at least one first body part is selected from a list of body parts consisting of: a foot, a hand, an arm, a leg, a part of an arm, a part of a leg, a digit, a head, an eye, an identified dorsal region of a torso, and an identified ventral region of a torso; and
wherein at least one of the second body part is selected from said list of body parts.

14. A monitoring system for detecting offensive behavior having a sexual nature, comprising: at least one device, comprising at least one processing circuitry configured for:
receiving from at least one image sensor connected to the at least one processing circuitry, at least one digital image captured by the at least one image sensor;
identifying a nature of at least one relationship between at least one first body part of at least one first person and at least one second body part of at least one second person, where the at least one first person and the at least one second person are identified in the at least one digital image;
identifying at least one offending relationship according to the nature of the at least one relationship and a set of relationship rules indicative of sexual offensive relationships; and
outputting an indication of the at least one offending relationship;
wherein at least one of the at least one first body part is selected from a list of body parts consisting of: a foot, a hand, an arm, a leg, a part of an arm, a part of a leg, a digit, a head, an eye, an identified dorsal region of a torso, and an identified ventral region of a torso; and
wherein at least one of the second body part is selected from said list of body parts.

15. The monitoring system of claim 1, wherein said set of relationships rules is based on cultural norms.

16. The monitoring system of claim 1, wherein said set of relationships rules is a set of religion based rules.

17. The monitoring system of claim 3, wherein said plurality of relationship characteristics are context dependent.

18. The monitoring system of claim 4, wherein said neural network computes said plurality of computed relationship characteristics by performing skeletonization.

* * * * *